Dec. 9, 1924. 1,519,082
P. J. HOWE
CORNER GAUGE
Filed Dec. 4, 1922
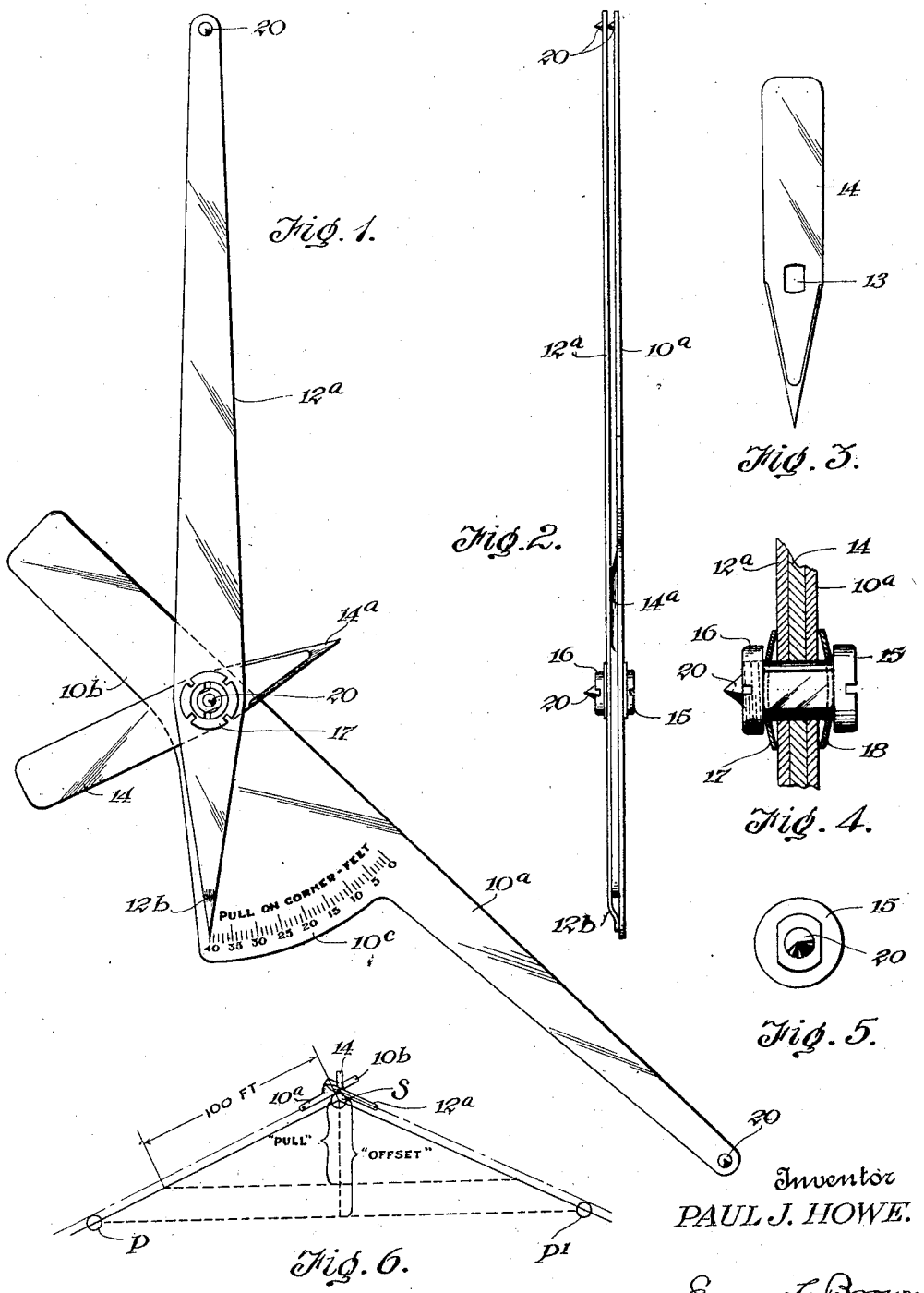
Inventor
PAUL J. HOWE.
Eugene C. Brown
Attorney Patented Dec. 9, 1924.

1,519,082

UNITED STATES PATENT OFFICE.

PAUL J. HOWE, OF RIDGEWOOD, NEW JERSEY, ASSIGNOR TO THE WESTERN UNION TELEGRAPH COMPANY, OF NEW YORK, N. Y., A CORPORATION OF NEW YORK.

CORNER GAUGE.

Application filed December 4, 1922. Serial No. 604,860.

*To all whom it may concern:*

Be it known that I, PAUL J. HOWE, a citizen of the United States, residing at Ridgewood, in the county of Bergen and State of New Jersey, have invented certain new and useful Improvements in Corner Gauges, of which the following is a specification.

This invention relates to measuring instruments for determining the magnitude of angles and is particularly intended to indicate the amount of deviation from a straight line in the setting of a corner pole in a pole line.

In constructing a pole line for supporting telegraph, telephone or power wires, it is frequently necessary to provide an offset or deviation from a straight line to carry the lines around some obstruction or for other reasons. Inasmuch as the strains or "pull" exerted upon the corner pole by the supported wires increases very materially with the degree of deviation of offset, the type of construction to be used at these corners must be determined by the size of the corner or magnitude of the angle between the two sections of line. By reason of the relationship between the amount of strain on the pole construction and the size of the angle at the corner, it is customary to designate the size of a corner, not by the magnitude of the angle between the two intersecting sections of line, but by the term "pull" which has been adopted by construction engineers to mean the perpendicular distance from the corner pole to a line connecting two points located 100 feet away from the corner pole upon opposite sides and in lines connecting the corner pole with the two adjacent poles.

The object of the present invention is to provide an instrument for readily determining the angle at the corner, but calibrated to read directly in terms of the "pull."

In the accompanying drawings, Figure 1 is a top plan view of a corner gauge embodying my invention; Fig. 2 is a side edge view; Fig. 3 is a plan view of the pointed supporting stick pin; Fig. 4 is a fragmentary sectional view through the pivot bolt; Fig. 5 is a top plan view of the bearing pin showing the central sight point; and Fig. 6 is a diagrammatic view showing the manner of using the instrument.

The gauge comprises an under plate member having a forwardly extended sighting arm $10^a$, a rearwardly projecting handle portion $10^b$ and an intermediate widened segmental portion $10^c$ provided with graduations calibrated to indicate the "pull" in feet of perpendicular distance from the corner pole to the base or reference line connecting the two points 100 feet from the corner upon the opposite section lines, this intermediate portion thus forming a graduated sector. The upper sighting member comprises a forwardly extending sighting arm $12^a$ and a rearwardly extending pointer or index arm $12^b$, the pointed end of which moves over the graduations of the scale.

Between the two sight arms is a supporting member in the form of a pin 14 having a sharp pointed end $14^a$ adapted to be driven into a stake to hold the gauge in position when making an observation and taking a reading. The several members are perforated to receive a pivot bolt 15, which is threaded at one end to receive a nut 16. I prefer to flatten the sides of the bolt and to make the hole 13 in the stick pin 14, and also the holes in the cupped spring washers 17, 18, elongated to fit the bolt so that these parts remain fixed, while the holes in the sight members are circular and have a diameter equal to the diameter of the bolt to enable them to swing freely about the pivot. The pressure of the spring washers holds the sight arms frictionally in any adjusted position. The outer ends of the sight arms and also the pivot bolt are provided with sight point 20.

The manner of using the corner gauge is illustrated in Figure 6. In a line of poles, P, S, and P′ represent three consecutive poles not in a straight line. In order to determine the so-called "pull," or magnitude of the corner, at the pole S, the sharp end of the stick pin 14 is first driven into the pole in a horizontal position on the side of the pole outside the corner and approximately in line with the bisector of the angle of the corner. Then by adjusting the sight arms until the sight lines across the "sights" 20 are in line with the poles P and P′ respectively, the corner angle is read directly in terms of the "pull" by noting the calibration point on the sector scale under the end of the pointer $12^b$. The same method is also used in measuring the corner at a prospective pole location by driving stakes into the ground in place of the poles designated as P, S and P'.

The advantage in the reduction of the amount of time and labor heretofore required in determining the magnitude of corners will be apparent. It was necessary heretofore to either measure the "offset," which is the perpendicular distance from the pole or stake S to an imaginary line connecting poles or stakes P and P', and then determine the "pull" from a table of calculations, or to determine the "pull" directly by measuring off from S distances of 100 ft. in each of the adjoining sections of line, to set stakes at these points, and then to measure the perpendicular distance from S to an imaginary line connecting the stakes. The present invention makes it unnecessary to place stakes at these points and also eliminates all measuring and the use of a table. It is evident that this corner gauge can be used for all pole spacings.

I claim:—

1. A corner gauge for determining the angle of intersection between the lines extending from an offset pole to the two adjacent poles of a telegraph or other pole line, comprising a pair of sight arms and a supporting member, a pivot bolt upon which said arms and said member are mounted, the supporting member having a sharp pointed end for insertion in a stake or pole, one of said arms carrying graduations and the other arm having a pointer movable over said graduations.

2. A corner gauge for indicating directly the angle of intersection between the lines extending from an offset pole to the two adjacent poles in a telegraph or other pole line, in terms of the so-called "pull," comprising a pair of sight arms and an interposed member pivotally secured together, one of said arms being provided with a scale graduated in terms of the "pull" and the other arm having a pointer movable over said scale.

In testimony whereof I affix my signature.

PAUL J. HOWE.